United States Patent
Wang

(10) Patent No.: US 10,420,286 B2
(45) Date of Patent: Sep. 24, 2019

(54) METHOD FOR MANUFACTURING BLADE BEDS OF A GARDEN SHEAR

(71) Applicant: Green Guard Industry Ltd., Taichung (TW)

(72) Inventor: Kuang Pin Wang, Taichung (TW)

(73) Assignee: Green Guard Industry Ltd., Taichung (TW)

(*) Notice: Subject to any disclaimer, the term of this patent is extended or adjusted under 35 U.S.C. 154(b) by 0 days.

(21) Appl. No.: 16/251,603

(22) Filed: Jan. 18, 2019

(65) Prior Publication Data

US 2019/0246569 A1 Aug. 15, 2019

(30) Foreign Application Priority Data

Feb. 14, 2018 (TW) .............................. 107105599 A

(51) Int. Cl.
*B21D 53/64* (2006.01)
*A01G 3/02* (2006.01)
*A01G 3/025* (2006.01)

(52) U.S. Cl.
CPC ......... *A01G 3/0251* (2013.01); *B21D 53/642* (2013.01)

(58) Field of Classification Search
CPC .... A01G 3/0251; B21D 53/642; B21D 53/64; B21K 11/06; B23B 15/28–52; B23P 23/00–06
See application file for complete search history.

(56) References Cited

U.S. PATENT DOCUMENTS

| | | | | | |
|---|---|---|---|---|---|
| 5,570,510 A | * | 11/1996 | Linden | ................. | A01G 3/0251 30/250 |
| 5,676,496 A | * | 10/1997 | Littecke | ................ | B23B 27/145 407/118 |
| 6,318,212 B1 | * | 11/2001 | Gomas | ................... | B21D 53/60 76/101.1 |
| 2005/0081386 A1 | | 4/2005 | Chang | | |

FOREIGN PATENT DOCUMENTS

| TW | 319122 U | 11/1997 |
|---|---|---|
| TW | I479987 A | 4/2015 |
| TW | I586503 A | 6/2017 |

* cited by examiner

*Primary Examiner* — Stephen Choi
(74) *Attorney, Agent, or Firm* — C. G. Mersereau; DeWitt LLP

(57) ABSTRACT

A method for manufacturing blade beds of a garden shear, wherein each of two blade beds has a length and a thickness far less than the length; the method includes: using extrusion method to extrude two blanks in directions parallel to directions of thickness of two blade beds respectively, wherein cross sections of the two blanks are shaped into the two blade beds; slicing the two blanks perpendicularly to the extruding direction into a plurality of pieces at intervals of distances equal to the thickness of the two blade beds respectively; and chamfering a plurality of peripheries of the pieces by punching.

6 Claims, 6 Drawing Sheets

METHOD FOR MANUFACTURING BLADE BEDS OF A GARDEN SHEAR

BACKGROUND OF THE INVENTION

Technical Field

The present invention relates to garden shears, and more particularly to a method for manufacturing blade beds of a garden shear.

Description of Related Art

Garden shears for cutting branches, flowers or grass include three parts such as handles, blade beds coupled with the handles and blades coupled with the blade beds. The blade beds and the blades need structure strength in usual work, so they are made of metals and formed by forging conventionally. Forging is a manufacturing process including heating a raw metal and hammering or pressing to cause elastic deformation for a purpose of shaping. As the metal is shaped during the forging process, its internal grain texture deforms to follow the general shape of the part so as to raise mechanical properties. Accordingly, mechanical elements which take heavy loads are usually made by forging.

However, as shown in FIGS. 5 and 6, a semi-finished product 4 during the forging process includes a desired part 41 and a scrap part 42. The scrap part 42 must be cut off for obtaining the desired part 41. After cutting, the scrap part 42 is obliged to be discarded rather than recycled because of its fragmented shape and irreversible reorganized metal texture. Thus it causes much waste and high cost.

Besides, for the purpose of coupling a shaft, it is necessary to additionally treat with a drill process on the blade bed manufactured by forging to form shaft holes. Hence the whole production program possesses too many processes to save time and to simplify.

SUMMARY OF THE INVENTION

The primary objective of the present invention is to provide a manufacturing method for blade beds of a garden shear where the product is cut from a blank manufactured by extrusion so as to reduce scraps and ensure the product having enough structure strength.

For achieving the foregoing and other objectives, the present invention provides a method for manufacturing blade beds of a garden shear, wherein the garden shear includes a first blade bed and a second blade bed, each of the first blade bed and the second blade bed has a length and a thickness far less than the length; which comprises:

utilizing an extrusion method to extrude a first blank in a first longitudinal direction parallel to a direction of the thickness of the first blade bed and a second blank in a second longitudinal direction parallel to a direction of the thickness of the second blade bed, wherein a cross section of the first blank about the first longitudinal direction is shaped into the first blade bed, and a cross section of the second blank about the second longitudinal direction is shaped into the second blade bed;

slicing the first blank perpendicularly to the first longitudinal direction into a plurality of first pieces at intervals of a first distance equal to the thickness of the first blade bed and the second blank perpendicularly to the second longitudinal direction into a plurality of second pieces at intervals of a second distance equal to the thickness of the second blade bed; and chamfering a plurality of peripheries of the first pieces and the second pieces by punching.

In one embodiment, each of the first blank and the second blank has a gear portion capable of engaging with each other as well as at least one shaft hole and at least one lightening hole.

In one embodiment, the method further comprises: forming a step portion on the first pieces by milling.

In one embodiment, the method further comprises: using a grinding machine to polish the first pieces and the second pieces after previous processes are finished, wherein the grinding machine functions by vibration or by rollers.

DETAILED DESCRIPTION OF THE INVENTION

Figure 1:
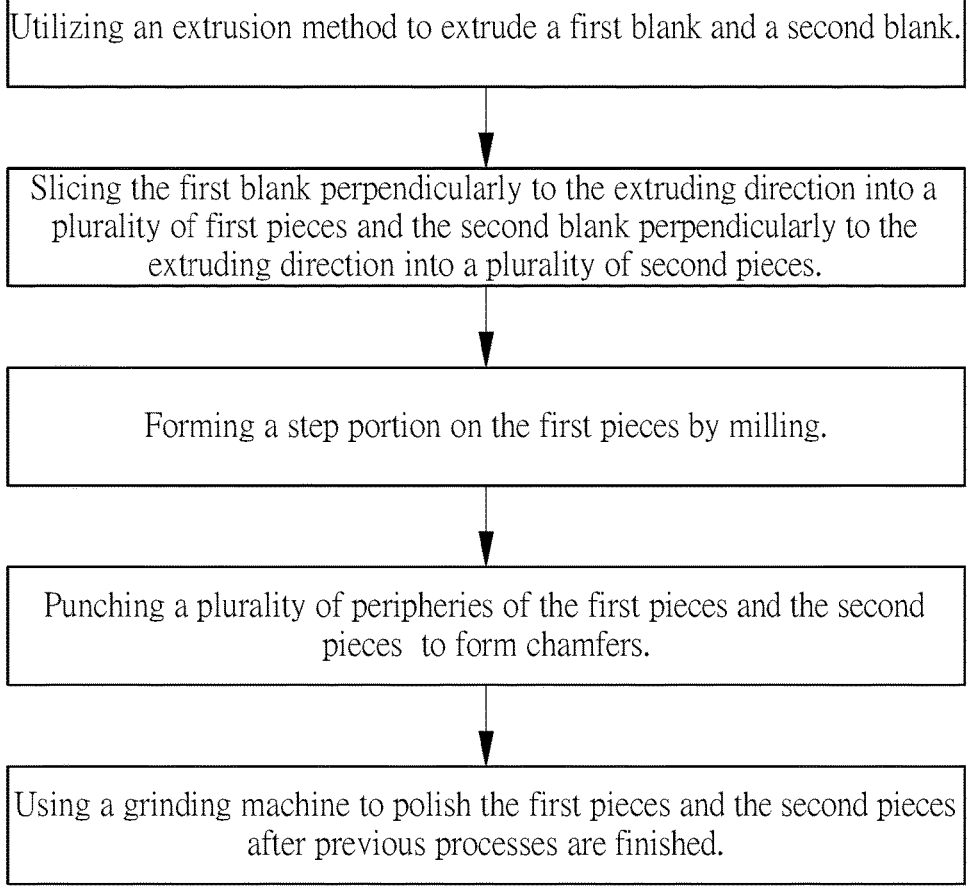
FIG. 1 is a flowchart of a manufacturing method according to the present invention.
Figure 2:
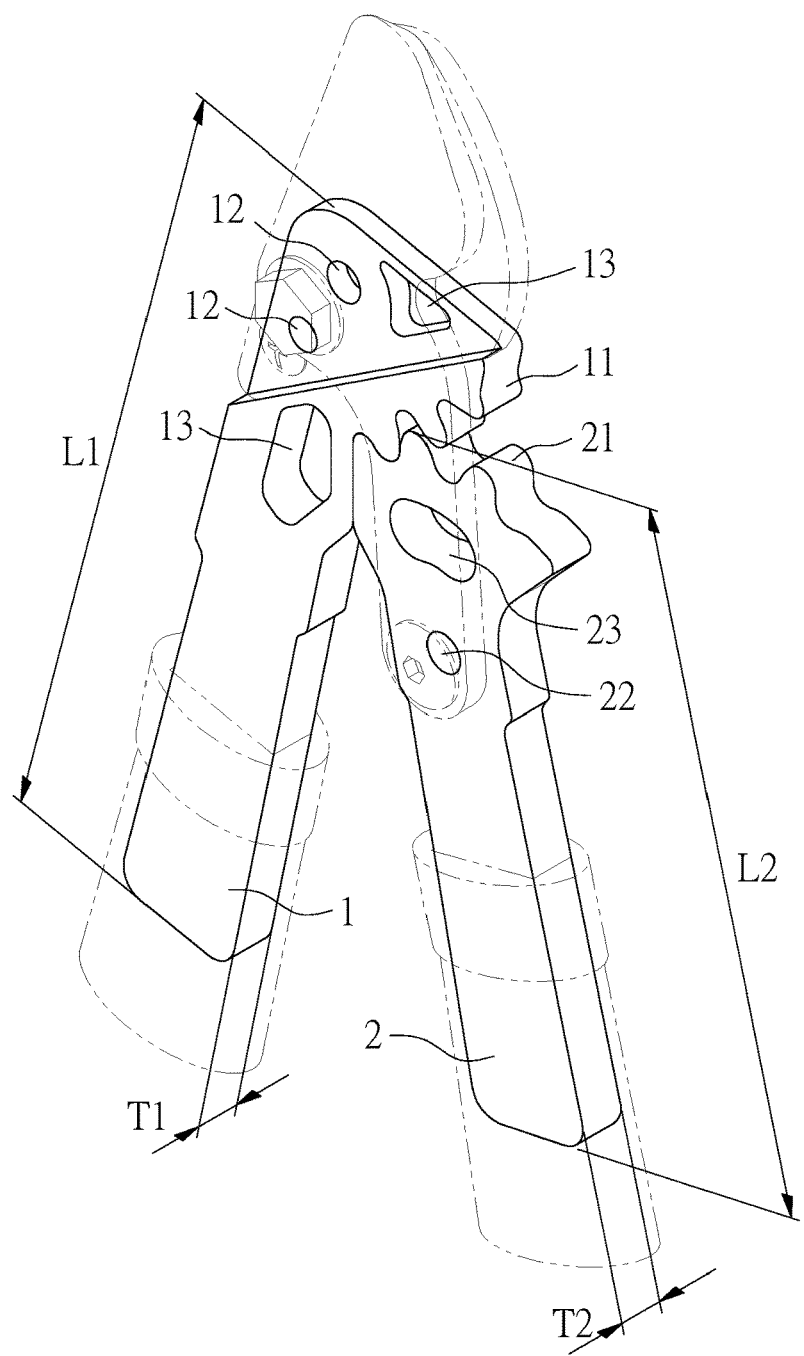
FIG. 2 is a perspective view of blade beds of a garden shear manufactured from the method according to the present invention.

FIG. 1 illustrates a flowchart of a manufacturing method for blade beds of a garden shear according to the present invention. The garden shear abovementioned includes a first blade bed 1 and a second blade bed 2 as shown in FIG. 2. The first blade bed 1 has a length L1 and a thickness T1 far less than the length L1. Viewing in a direction of the thickness of the first blade bed 1, the first blade bed 1 has a gear portion 11 disposed at one side. Two shaft holes 12 and two lightening holes 13 penetrate through the first blade bed 1. Thereby a shape of the first blade bed 1 forms. On the other hand, the second blade bed 2 has a length L2 and a thickness T2 far less than the length L2. Viewing in a direction of the thickness of the second blade bed 2, the second blade bed 2 has a gear portion 21 capable of engaging with the gear portion 11 disposed at one side. One shaft hole 22 and one lightening hole 23 penetrate through the second blade bed 2. Thereby a shape of the second blade bed 2 forms.

The method comprises the following steps:

utilizing an extrusion method to extrude a first blank and a second blank;

slicing the first blank perpendicularly to the extruding direction into a plurality of first pieces and the second blank perpendicularly to the extruding direction into a plurality of second pieces;

forming a step portion on the first pieces by milling;

chamfering a plurality of peripheries of the first pieces and the second pieces by punching;

using a grinding machine to polish the first pieces and the second pieces after previous processes are finished.

Figure 3:
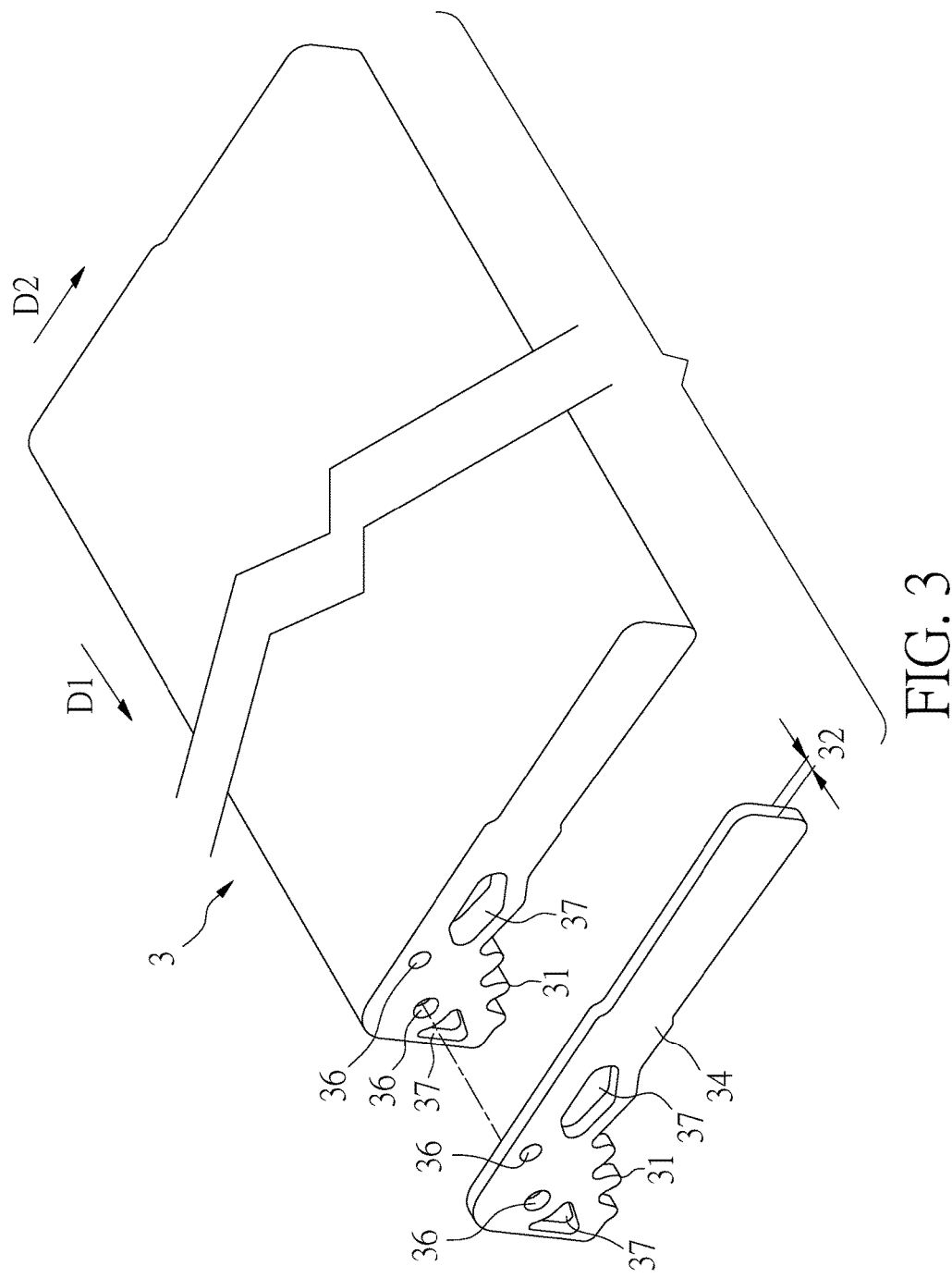
FIG. 3 is a perspective view showing the manufacturing process of the method according to the present invention.

In the present embodiment, the first blank 3 (as shown in FIG. 3) and the second blank are made of aluminum alloy and manufactured by the extrusion method. The mold used to extrude the first blank 3 has a mold cavity for forming the shape of the first blade bed 1 (including the gear portion 11), two cores for forming the shaft holes 12 and two cores for forming the lightening holes 13. The mold used to extrude the second blank has a cavity for forming the shape of the second blade bed 2 (including the gear portion 21), one core for forming the shaft hole 22 and one core for forming the lightening hole 23. By using the molds, the first blank 3 is extruded in a first longitudinal direction D1 parallel to a direction of the thickness of the first blade bed 1, wherein a cross section of the first blank 3 about the first longitudinal direction D1 is shaped into the first blade bed 1, including the gear portion 31, the two shaft holes 36 and the two lightening holes 37. On the other hand, the second blank is extruded in a second longitudinal direction parallel to a direction of the thickness of the second blade bed 2, wherein a cross section of the second blank about the second longitudinal direction is shaped into the second blade bed 2, including the gear portion, the shaft hole and the lightening hole.

Each of the first blank 3 and the second blank forms a long structure as a result of the extrusion production process. Then using a cutting machine such as a sawing machine to slice the first blank 3 and the second blank respectively. As shown in FIG. 3, the first blank 3 is sliced along a direction D2 perpendicular to the first longitudinal direction D1 into a plurality of first pieces 34 at intervals of a first distance 32 equal to the thickness of the first blade bed. Each of the first pieces 34 has identical structure including the gear portion 31, the two shaft holes 36 and the two lightening holes 37. Similarly, the second blank is sliced perpendicularly to the second longitudinal direction into a plurality of second pieces at intervals of a second distance equal to the thickness of the second blade bed.

Figure 4:
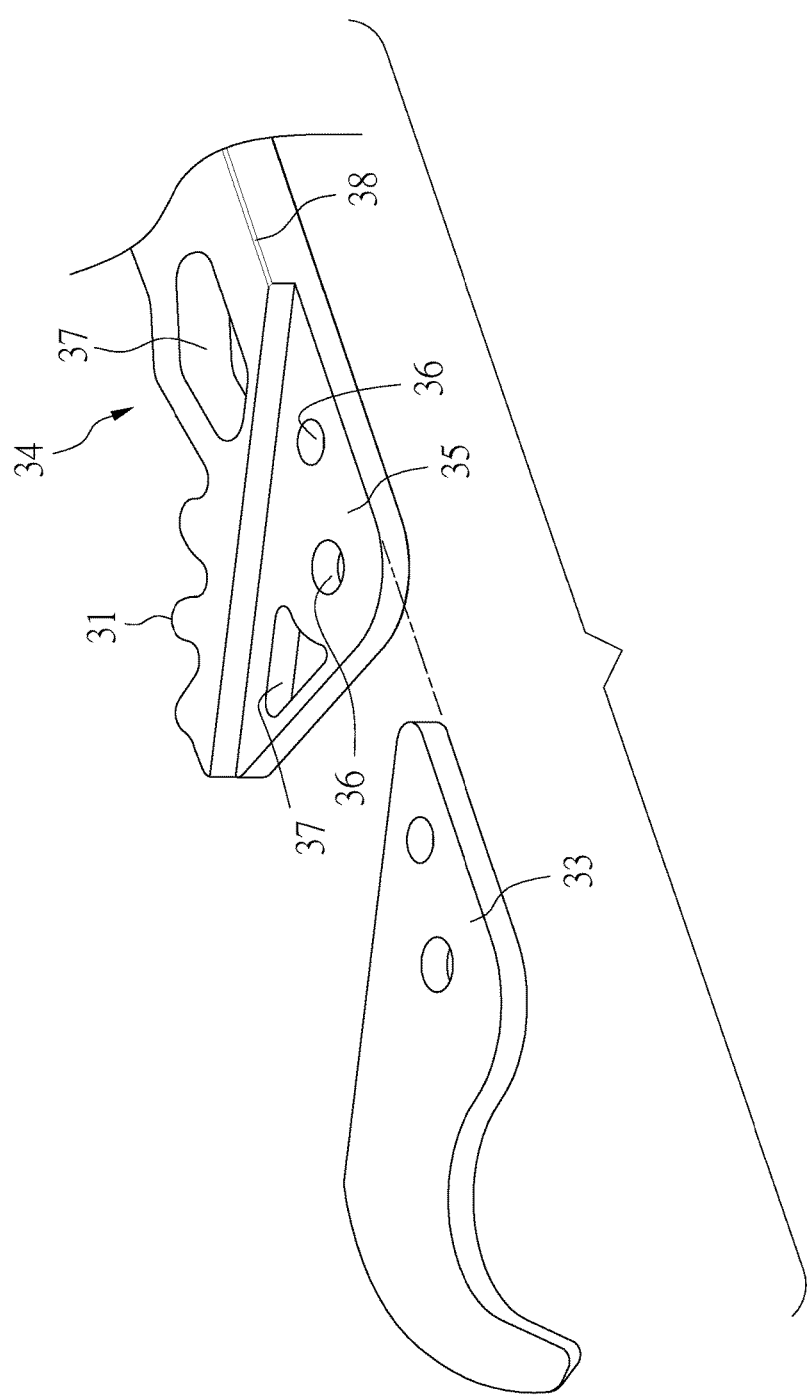
FIG. 4 is an enlarged, perspective view of a blade bed manufactured from the method according to the present invention.
Figure 5:
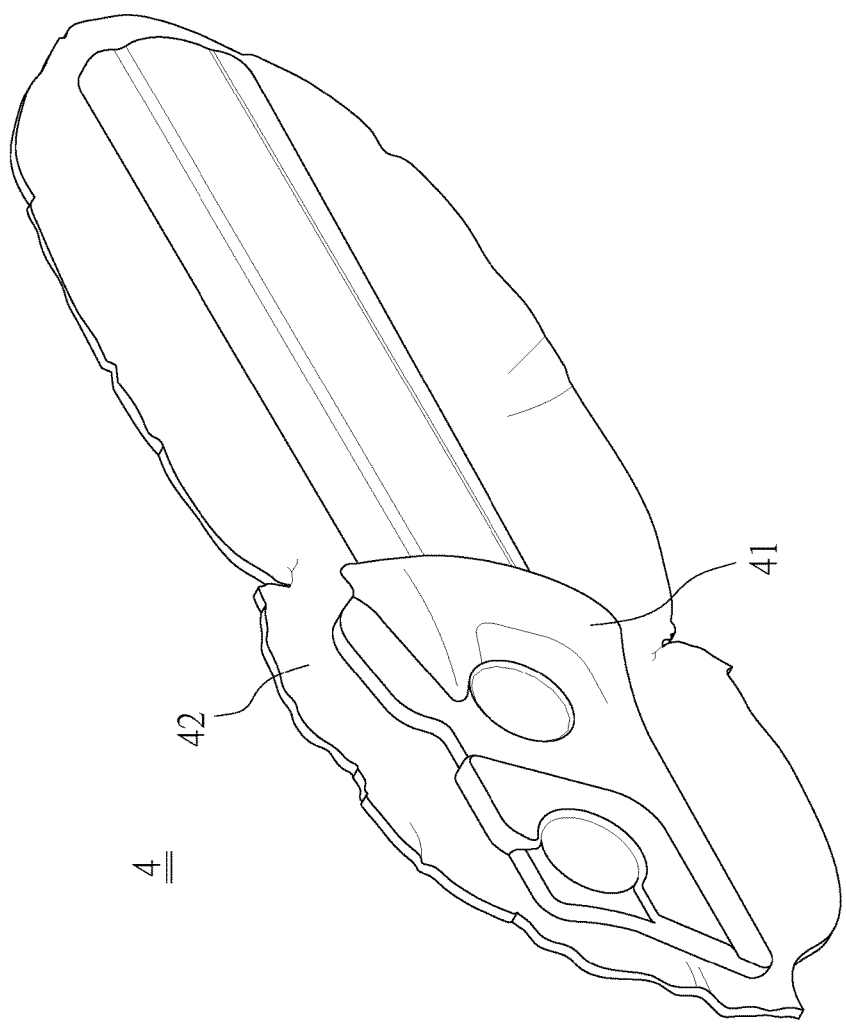
FIG. 5 is a perspective view of a blank manufactured from a conventional forging method.
Figure 6:
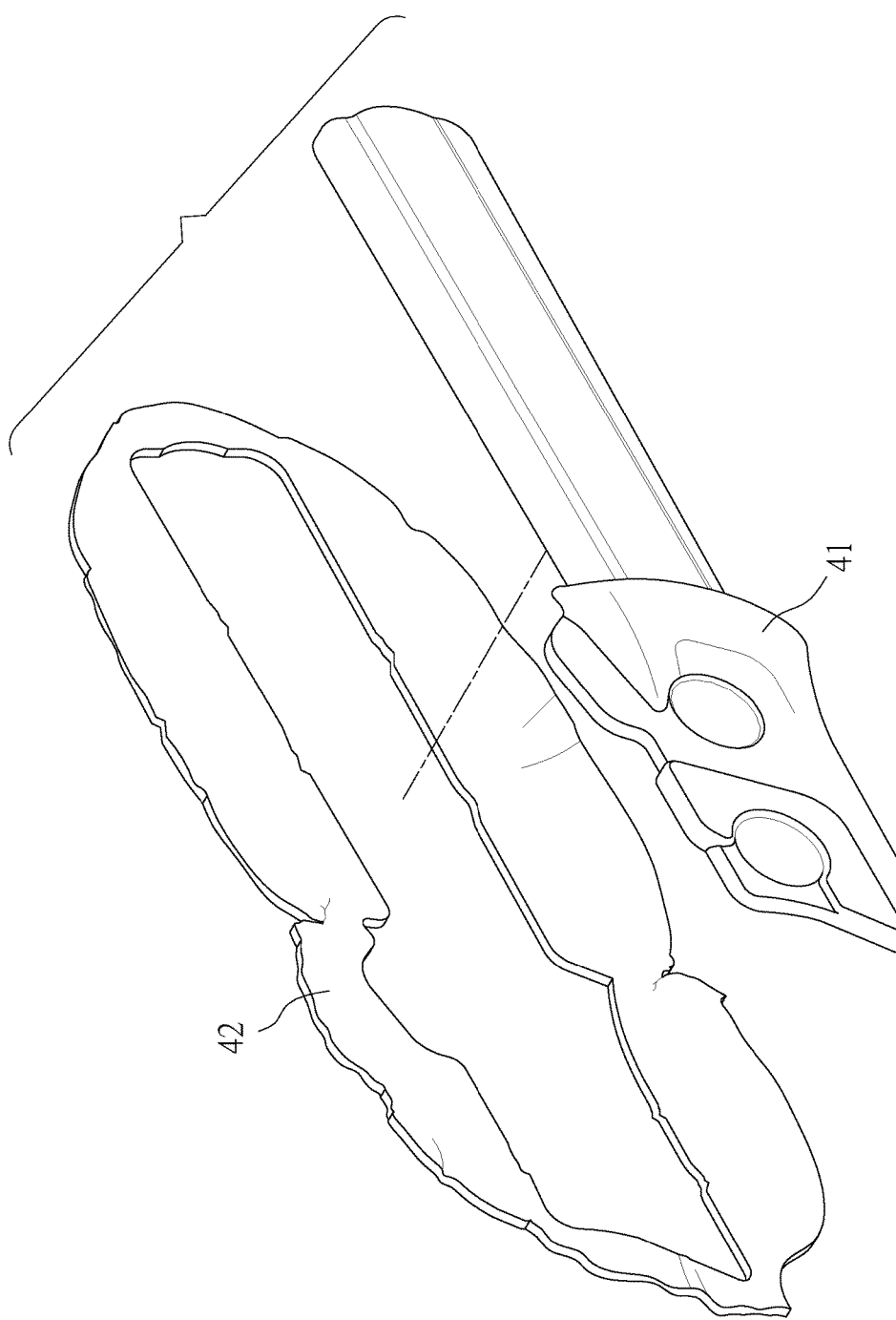
FIG. 6 is a perspective view of a finished product from the blank of FIG. 5.

Next, as shown in FIG. 4, using a milling machine to mill the first piece 34 in a desired area to form a step portion 35 with a depth equal to a thickness of a blade 33 coupled in the step portion 35, making the blade 33 be level with the first piece 34.

Moreover, using a punching machine to punch the first pieces 34 and the second pieces to form a chamfer 38 on the peripheries, preventing users from being injured by the burrs.

After the previous processes are finished, using a grinding machine such as vibration grinder and roller grinder to polish the first pieces 34 and the second pieces, making the surface smooth. Then a product of the first blade bed or the second blade bed comes into existence.

The first blade bed and the second blade bed are shaped directly without scraps due to the extrusion production process for the improvement of conventional forging production process. The product can also achieve the objective in structure strength.

Furthermore, when the extrusion production process is proceeding, or before the first blank 3 and the second blank are sliced, there have been at least one shaft hole and at least one lightening hole on the first blank 3 and the second blank. Hence it is not necessary to treat an additional drill process as the conventional forging production process does.

It is commonly known that the extrusion production process is used to manufacture long items such as aluminum frames of doors or windows. Even though the item is cut, the product is still in a shape of larger length with less width. Therefore, it becomes a technical bias about the only purpose of the extrusion production process for long items. The present invention succeeds in overcoming the bias and developing a manufacturing method that never seen for an application of the extrusion production process to blade beds of a garden shear which is thin and flat.

What is claimed is:

1. A method for manufacturing blade beds of a garden shear, wherein the garden shear includes a first blade bed and a second blade bed, each of the first blade bed and the second blade bed has a length and a thickness less than the length; the method comprising:
   utilizing an extrusion method to extrude a first blank in a first longitudinal direction parallel to a direction of the thickness of the first blade bed and a second blank in a second longitudinal direction parallel to a direction of the thickness of the second blade bed, wherein a cross section of the first blank about the first longitudinal direction is shaped into the first blade bed, and a cross section of the second blank about the second longitudinal direction is shaped into the second blade bed;
   slicing the first blank perpendicularly to the first longitudinal direction into a plurality of first pieces at intervals of a first distance equal to the thickness of the first blade bed and the second blank perpendicularly to the second longitudinal direction into a plurality of second pieces at intervals of a second distance equal to the thickness of the second blade bed; and
   punching a plurality of peripheries of the first pieces and the second pieces to form chamfers.

2. The method of claim 1, wherein each of the first blank and the second blank has a gear portion capable of engaging with each other.

3. The method of claim 1, wherein each of the first blank and the second blank has at least one shaft hole and at least one lightening hole.

4. The method of claim 1, further comprising: forming a step portion on the first pieces by milling.

5. The method of claim 1, further comprising: finally utilizing a grinding machine to polish the first pieces and the second pieces.

6. The method of claim 5, wherein the grinding machine functions by vibration or by rollers.

* * * * *